United States Patent
Butler et al.

(10) Patent No.: US 10,453,105 B2
(45) Date of Patent: Oct. 22, 2019

(54) ENCRYPTED PAYMENT IMAGE

(75) Inventors: David G Butler, Eagle, ID (US);
Kenneth K Smith, Boise, ID (US);
Andrew Alegria, Meridian, ID (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 1076 days.

(21) Appl. No.: 13/434,938

(22) Filed: Mar. 30, 2012

(65) Prior Publication Data

US 2013/0262314 A1    Oct. 3, 2013

(51) Int. Cl.
| | | |
|---|---|---|
| *G06Q 30/04* | (2012.01) | |
| *G06Q 20/32* | (2012.01) | |
| *H04L 9/32* | (2006.01) | |
| *G06Q 20/04* | (2012.01) | |
| *G07G 5/00* | (2006.01) | |

(52) U.S. Cl.
CPC ......... *G06Q 30/04* (2013.01); *G06Q 20/0453* (2013.01); *G06Q 20/322* (2013.01); *G06Q 20/3274* (2013.01); *G06Q 20/3276* (2013.01); *G07G 5/00* (2013.01); *H04L 9/3234* (2013.01); *H04L 9/3242* (2013.01); *H04L 9/3247* (2013.01); *H04L 2209/56* (2013.01); *H04L 2209/80* (2013.01)

(58) Field of Classification Search
CPC .. G06Q 30/04; G06Q 20/322; G06Q 20/0453; G06Q 20/3276; G06Q 20/3274; G07G 5/00; H04L 9/3242; H04L 9/3234; H04L 9/3247; H04L 2209/80; H04L 2209/56
See application file for complete search history.

(56) References Cited

U.S. PATENT DOCUMENTS

| | | | | |
|---|---|---|---|---|
| 5,841,555 | A  * | 11/1998 | Bianco et al. | 359/2 |
| 7,784,684 | B2 * | 8/2010 | Labrou et al. | 235/380 |
| 8,083,134 | B2 | 12/2011 | Hogg et al. | |
| 2007/0022058 | A1 * | 1/2007 | Labrou et al. | 705/67 |
| 2009/0254440 | A1 | 10/2009 | Pharris | |
| 2011/0191244 | A1 | 8/2011 | Dai | |
| 2011/0251892 | A1 | 10/2011 | Laracey | |
| 2011/0264586 | A1 * | 10/2011 | Boone et al. | 705/67 |
| 2011/0311042 | A1 * | 12/2011 | Cheddad et al. | 380/28 |
| 2012/0209749 | A1 * | 8/2012 | Hammad et al. | 705/27.1 |
| 2012/0230577 | A1 * | 9/2012 | Calman et al. | 382/138 |
| 2013/0124855 | A1 * | 5/2013 | Varadarajan | G06Q 20/3276 713/155 |
| 2014/0337175 | A1 * | 11/2014 | Katzin et al. | 705/26.62 |

FOREIGN PATENT DOCUMENTS

IN    1590/MUM/2007    5/2009

OTHER PUBLICATIONS

A 2D Barcode-Based Mobile Payment System by Jerry Gao et al. (Year: 2009).*

* cited by examiner

*Primary Examiner* — Neha Patel
(74) *Attorney, Agent, or Firm* — Sheppard Mullin Richter & Hampton LLP

(57) ABSTRACT

Embodiments disclosed herein relate to an encrypted payment image. In one embodiment, a processor of a mobile computing device encrypts a binary version of an invoice image with a payment information encryption key. The processor may generate a payment image of the encrypted binary of the invoice image and display the payment image.

7 Claims, 5 Drawing Sheets

ENCRYPTED PAYMENT IMAGE

BACKGROUND

A purchaser may authorize and authenticate a payment invoice to make a purchase at a retail location. For example, a retailer may provide a paper or digital receipt, and a purchaser may sign to indicate that the purchase is authorized and that the purchaser is authorized to use the selected payment method.

BRIEF DESCRIPTION OF THE DRAWINGS

The drawings describe example embodiments. The following detailed description references the drawings, wherein.

DETAILED DESCRIPTION

A retailer may request a signed receipt or invoice for a purchase as proof to a payment entity, such as bank or credit card company, that an authenticated purchaser authorized the purchase. In one implementation, a purchaser may authorize and authenticate a purchase using a mobile device, such as a mobile device with a camera and display, by cryptographically signing an image of an invoice with payment account information.

As an example, a mobile device may capture an image of an invoice displayed on a retail computing device. The mobile device may create a binary version of the image and encrypt the binary version with a secret key. The secret key may be the purchaser's account number such that the secret key is also known by the payment entity with whom the account is held. The mobile device may create a payment image from the encrypted binary and display the image. The purchaser may scan the displayed payment image to a retail computing device using a scanner associated with the retailer, and the retailer may transmit the payment image of the encrypted binary version of the image to the payment entity to receive payment. The payment entity may decrypt a binary version of the payment image using the account number key. The decrypted binary may include the invoice information, such as the total amount due for payment, and the payment entity may issue payment based on the invoice information.

Making a purchase using an encrypted payment image may allow a mobile device without internet access that includes a camera and display to authorize and authenticate a purchase. The image may be used to capture more transaction and encryption details that may be feasibly entered manually. Paying with a digitally signed invoice may allow the retailer to receive payment without accessing a purchaser's account information, which may protect the purchaser in the event that the retailer is hacked or in cases where the retailer is an untrustworthy merchant. A cryptographically signed invoice allows a payment entity to view invoice details after decrypting the signed invoice. The payment entity may use the invoice details, such as date and location of purchase, to prevent incorrect charges and duplicate charges. A transaction between computing devices may decrease the use of paper receipts.

Figure 1:
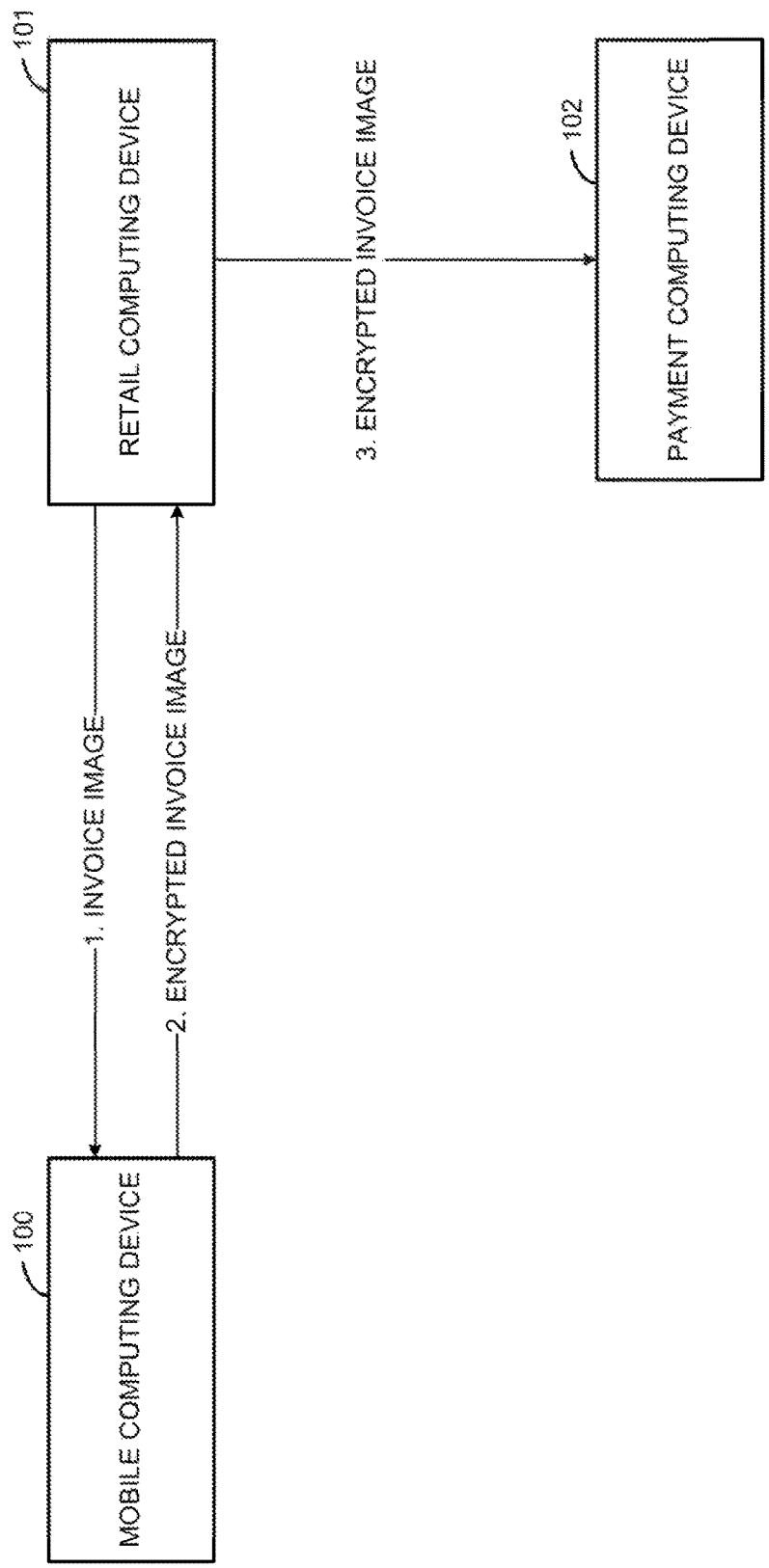
FIG. 1 is a diagram illustrating one example of communications to allow a mobile device to authorize and authenticate a purchase.

FIG. 1 is a diagram illustrating one example of communications to allow a mobile device to authorize and authenticate a purchase. For example, a mobile computing device 100 may make a purchase from a retail computing device 101 using a payment account issued by a payment entity associated with a payment computing device 102.

The mobile computing device 100 may be a tablet, mobile phone, or music player, and a user may bring the mobile computing device 100 to a retail location. The mobile computing device 100 may or may not have network access. The mobile computing device 100 is described in more detail in FIG. 2.

The retail computing device 101 may be a computing device at a retail location for allowing a user to make a purchase. For example, the retail computing device 101 may be a kiosk that allows a user to scan an item for purchase, determines the item and total, and allows the user to pay for the item. The retail computing device 101 may be a self-scanning lane in a retail location. In some cases, the purchase may be made outside of a retail setting, such as where a purchase is made from an individual. For example, the retail computing device 101 may be a personal computing device, such as a tablet, laptop, or mobile computing device communicating with a purchaser's device. The retail computing device 101 is described in more detail in FIG. 3.

The payment computing device 102 may be a computing device associated with a payment entity, such as a credit card company or bank, that processes a payment. For example, the payment computing device 102 may verify a user account number and pay the retailer from the user account.

The mobile computing device 100, retail computing device 101, and payment computing device 102 may communicate to allow a purchase to be made from the mobile computing device 100. For example, the retail computing device 101 may create an invoice including transaction information. The retail computing device 101 may display the invoice such that a camera on the mobile computing device 100 captures an image of the invoice. In one implementation, the invoice is displayed as a barcode. The invoice may be a sequence of barcodes. The mobile computing device 100 may create a binary version of the invoice and digitally sign the invoice with a secret key associated with a payment account. The mobile computing device 100 may display an image of the cryptographically signed invoice, and a user may scan the image to the retail computing device 101. The mobile computing device 100 may format the cryptographically signed image for display, such as by creating a barcode or sequence of barcodes of the cryptographically signed image binary. The mobile computing device 100 may cryptographically sign the image using an encryption key. For example, hash-based message authentication (HMAC) or public key infrastructure encryption may be used.

The retail computing device 101 may transmit the signed invoice to the payment computing device 102. The payment computing device 102 may decrypt the signed version of the invoice using the secret key and provide payment to the retailer from the user's account. In one implementation, the retail computing device 101 creates a barcode of an invoice to display as the invoice image.

Figure 2:
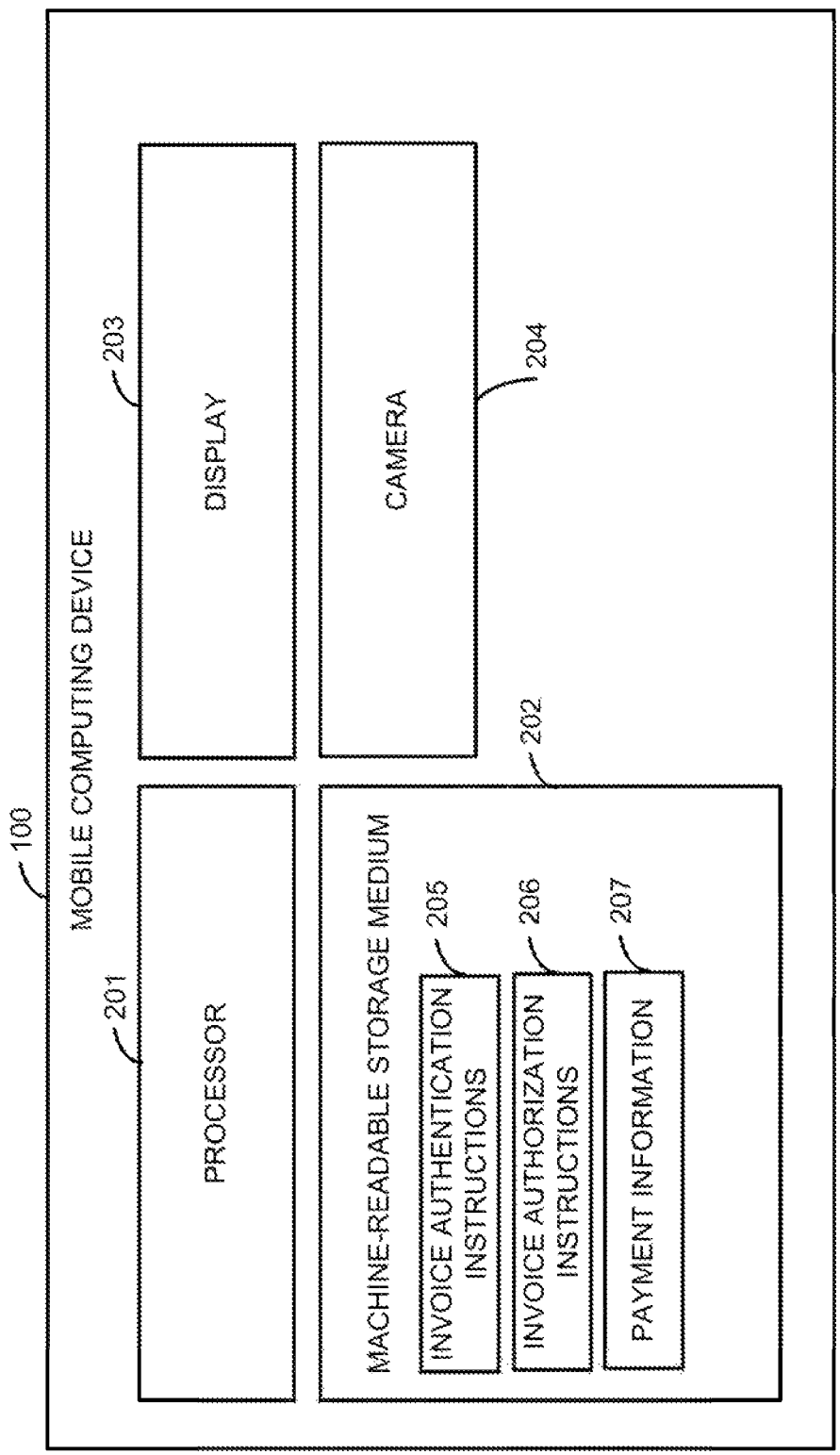
FIG. 2 is a block diagram illustrating one example of a mobile computing device to encrypt a payment image.

FIG. 2 is a block diagram illustrating one example of the mobile computing device 100 to encrypt a payment image. For example, the mobile computing device 100 from FIG. 1 may be used to create a cryptographically signed invoice image to be uploaded to the retailer computing device 101 as payment for a purchase from the retailer associated with the retail computing device 101. The mobile computing device 100 may include a processor 201, a machine-readable storage medium 202, a display 203, and a camera 204.

The display 203 may be a screen included within the mobile computing device 100. For example, the display 203 may be a mobile phone screen. The display 203 may be used to output information. In some implementations, the display 203 may receive user input, such as through touch or gestures relative to the display 203.

The camera 204 may be included within the mobile computing device 100. For example, the camera 204 may capture pictures from the mobile computing device 100 to be displayed on the display 203. In one implementation, the view of the camera is shown on the display 203 as a user captures a picture.

The processor 201 may be any suitable processor, such as a central processing unit (CPU), a semiconductor-based microprocessor, or any other device suitable for retrieval and execution of instructions. In one embodiment, the mobile computing device 100 includes logic instead of or in addition to the processor 201. As an alternative or in addition to fetching, decoding, and executing instructions, the processor 201 may include one or more integrated circuits (ICs) or other electronic circuits that comprise a plurality of electronic components for performing the functionality described below. In one implementation, the retail computing device 100 includes multiple processors. For example, one processor may perform some functionality and another processor may perform other functionality.

The machine-readable storage medium 202 may be any suitable machine readable medium, such as an electronic, magnetic, optical, or other physical storage device that stores executable instructions or other data (e.g., a hard disk drive, random access memory, flash memory, etc.). The machine-readable storage medium 202 may be, for example, a computer readable non-transitory medium.

The machine-readable storage medium 202 may include payment information 207. The payment information 207 may be information used to encrypt an invoice. For example, the payment information 207 may include an encryption key that is a secret key also known by a financial entity associated with payment information. The financial entity may use the payment information to decrypt information encrypted by the mobile computing device 100. A user may store the payment information 207 to be saved for future purchases or a user may enter and store the payment information 207 when a purchase is made. In one implementation, the payment information 207 includes multiple encryption keys where each key is associated with a different account. The mobile computing device 100 may generate a user interface to allow a user to select which account to use for a purchase. The payment information 207 may include account information and an associated encryption key. For example, the payment information 207 may include information about a payment entity associated with the encryption key such that the information may be displayed to a user to allow the user to select an account for payment.

The machine-readable storage medium 202 may include instructions executable by the processor 201. For example, the machine-readable storage 202 may include authentication instructions 205 and authorization instructions 206. The payment information 207, authentication instructions 205, and authorization instructions 206 may be stored in the same or separate storages.

The authentication instructions 205 may include instructions to authenticate an invoice by encrypting a binary version of an invoice using the payment information 207. For example, the mobile computing device 100 may receive an image of an invoice and determine a binary version of the invoice image. The mobile computing device 100 may cryptographically sign the invoice image with an encryption key stored in the payment information 207.

The authorization instructions 206 may include instructions to authorize the invoice by displaying the authenticated invoice on the display 203 to be provided to a retailer. For example, an image of the encrypted invoice image may be displayed on the display 203 to provide it to a retailer. The cryptographically signed invoice image may indicate that the user authorizes the particular purchase details described in the invoice. The retail computing device 101 may capture an image of the display 203 to receive the authorized invoice.

Figure 3:
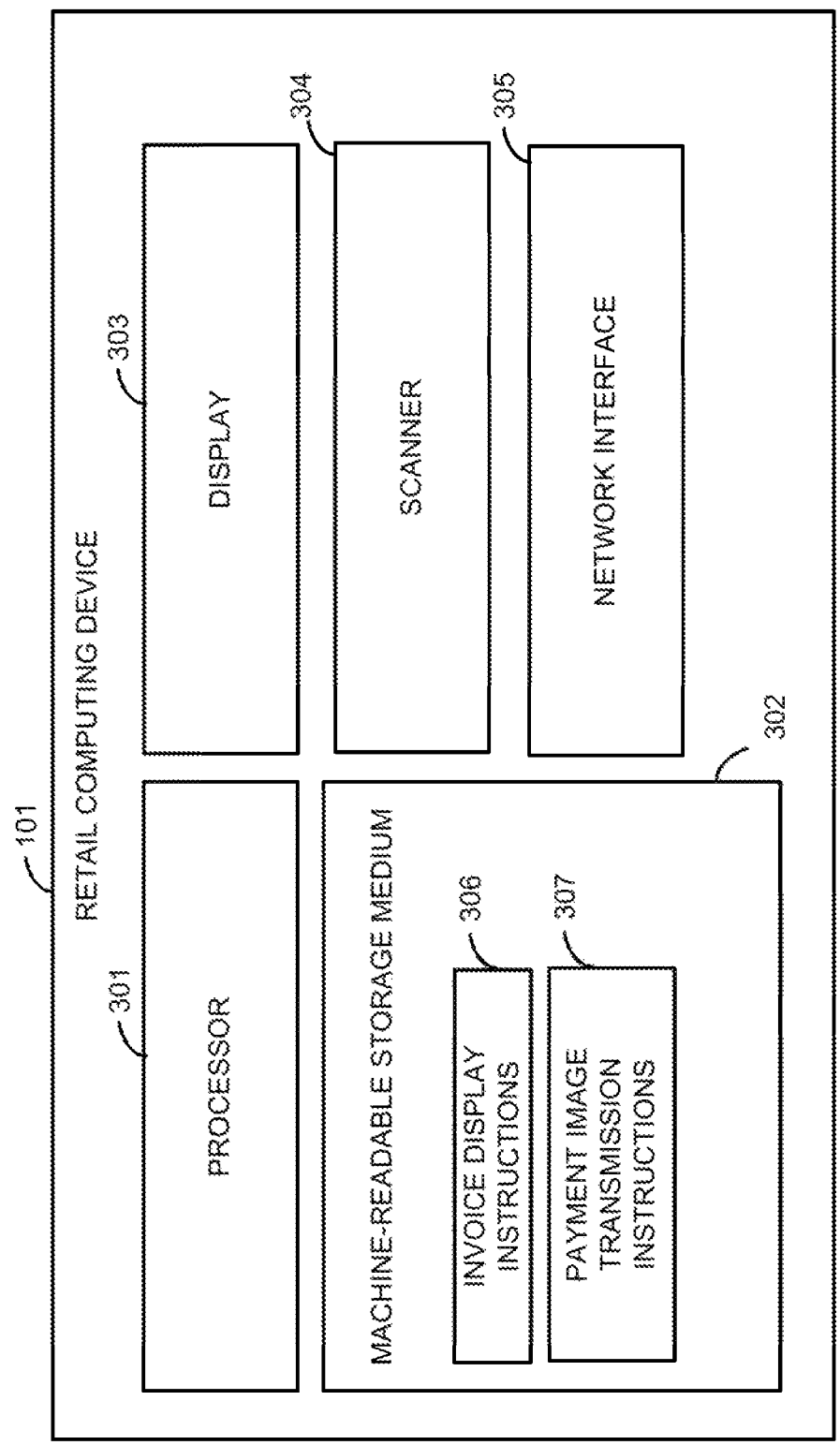
FIG. 3 is a block diagram illustrating one example of a retail computing device to receive payment from a cryptographically signed invoice image.

FIG. 3 is a block diagram illustrating one example of a retail computing device to receive payment from a cryptographically signed invoice image. For example, the retail computing device 101 from FIG. 1 may process payment information received from the mobile computing device 100. The retail computing device 101 may send transaction information to mobile computing device 100 and transmit payment information received from the mobile computing device 100 to a payment entity computing device, such as payment computing device 102. The retail computing device 102 may include a processor 301, a machine-readable storage medium 302, a display 303, a scanner 304, and a network interface 305.

The display 303 may be a display to show transaction information to a user. For example, the display 303 may display information about items purchased and payment totals. The display 303 may display an invoice related to a user's purchase.

The scanner 304 may be used to scan items for purchase. For example, a user may scan the barcode of an item to be purchased. In one implementation, the scanner 304 may scan a cryptographically signed payment image from a user's mobile device, such as the mobile computing device 100.

The network interface 305 may allow the retail computing device 101 to communicate via a network, such as the Internet. For example, the retail computing device 102 may communicate with a payment entity, such as with payment computing device 102, to receive payment for a transaction.

The processor 301 may be any suitable processor, such as a central processing unit (CPU), a semiconductor-based microprocessor, or any other device suitable for retrieval and execution of instructions. In one embodiment, the retail computing device 101 includes logic instead of or in addition to the processor 301. As an alternative or in addition to fetching, decoding, and executing instructions, the processor 301 may include one or more integrated circuits (ICs) or other electronic circuits that comprise a plurality of electronic components for performing the functionality described below. In one implementation, the retail computing device 101 includes multiple processors. For example, one processor may perform some functionality and another processor may perform other functionality.

The machine-readable storage medium 302 may be any suitable machine readable medium, such as an electronic, magnetic, optical, or other physical storage device that stores executable instructions or other data (e.g., a hard disk drive, random access memory, flash memory, etc.). The machine-readable storage medium 302 may be, for example, a computer readable non-transitory medium.

The machine-readable storage medium 302 may include instructions executable by the processor 301. For example, the machine-readable storage medium 302 may include invoice display instructions 306 and payment image transmission instructions 307.

The invoice display instructions 306 may include instructions to display invoice information on the display 303. In one implementation, the invoice display instructions 306 include instructions to create an invoice in a particular image format readable by the mobile computing device 100. For example, the invoice display instructions 306 include instructions to encode invoice information in a barcode to be displayed on the display 303. The invoice display instructions 306 may include instructions to encode the invoice information in a halftone image, such as in a steganographic halftone image. The mobile computing device 100 may capture an image of the display 303 of the invoice image.

The payment image transmission instructions 307 may include instructions to transmit payment information received from an image scanned by the scanner 304 to the payment computing device 102 via the network interface 304. For example, a user may use the scanner 304 to scan the display 203 of the mobile computing device 100. The display 203 may display an image of a cryptographically signed version of the invoice image provided by the retail computing device 101. The retail computing device 101 may transmit the scanned image to the payment computing device 102.

The retail computing device 101 may decode or format the scanned image prior to transmitting it to the payment computing device 102. In one implementation, the retail computing device 101 extracts information from the cryptographically signed image and transmits the extracted information to the payment computing device 102. For example, the retail computing device 101 may decode a barcode and send the decoded information to the payment computing device 102 or the retail computing device 101 may use optical character recognition to interpret the characters of the cryptographically signed image and transmit the character values to the payment computing device 102. The retail computing device 101 may determine a binary version of the cryptographically signed image and transmit the binary version to the payment computing device 102.

Figure 4:
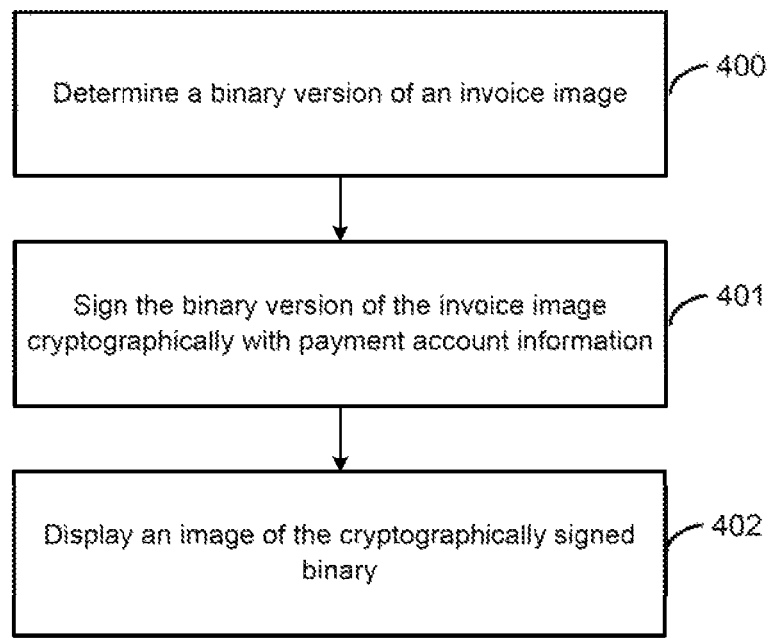
FIG. 4 is a flow chart illustrating one example of a method to encrypt a payment image.

FIG. 4 is a flow chart illustrating one example of a method to encrypt a payment image. A mobile computing device, such as the mobile computing device 100, may create an encrypted payment image to authenticate a purchase and provide the encrypted payment to a retail computing device to authorize a purchase. The mobile computing device may cryptographically sign a binary version of an invoice image to provide payment information and authentication. The method may be performed, for example, by the processor 201 of FIG. 1.

Beginning at 400, a mobile computing device, such as the mobile computing device 100, determines a binary version of an invoice image. The invoice image may be an image for displaying transaction information. The invoice may include information, such as payment total, items purchased, the retail entity name, purchaser name, and time of purchase.

The mobile computing device may receive the invoice image from a retailer. In one implementation, the mobile computing device receives the invoice via RFID or Bluetooth. In one implementation, a retailer displays the image invoice, and the mobile computing device captures an image of the invoice image. For example, a user may use a camera of the mobile computing device to capture the image of the invoice image displayed by the retail computing device.

In one implementation, the mobile computing device displays the invoice information. For example, a user may view the invoice information prior to authorizing the purchase. The mobile computing device may parse or decode the invoice image and display the transaction information to a user. As an example, the mobile computing device may capture an image of a barcode invoice image. The mobile computing device may decode the barcode to determine the invoice information and display the invoice information.

The mobile computing device may generate a user interface allow the user to confirm the transaction details. For example, the user interface may allow a user to select to proceed with the transaction after viewing the transaction details. Displaying the details to the user may prevent a retailer from creating a non-human readable invoice image that includes incorrect purchase information. The user may view the invoice details to provide authorization to the particular transaction details included in the invoice image.

The mobile computing device may determine the binary version of the invoice image. The invoice image may be any suitable type of digital image. In one implementation, the mobile computing device alters the image prior to determining the binary version. The invoice image may be encoded or formatted in a particular manner readable by the mobile computing device. For example, the image may be a barcode image, a text image, or a steganographic halftone image of transaction information. In one implementation, the image is displayed in a manner that the mobile computing device may decipher the contents using optical character recognition. For example, the mobile computing device may determine the ASCII binary of the text displayed in the invoice image. In one implementation, the invoice image is a steganographic halftone image. The invoice information image may be encoded by the placement of the pixels in the halftone image such that it may appear to be a solid color to the human eye. The ASCII binary of the steganographic halftone image may be determined from the image without the use optical character recognition. For example, the retailer may display or print the binary version of the halftone image.

Continuing to 401, the mobile computing device signs the binary version of the invoice image cryptographically with payment account information. For example, the mobile computing device may encrypt the binary version of the invoice image using a secret cryptographic key. The secret cryptographic key may be a shared secret key with a payment entity that is not shared with the retailer. The mobile computing device may encrypt the binary using a hash-based message authentication code (HMAC). For example, the binary of the invoice image may be encrypted using a cryptographic hash function and a secret key where the secret key relates to payment information shared with the payment entity. The secret key may be an account number, such as a credit card number, of an account held with the payment entity. In one implementation, the mobile computing device may use public key infrastructure (PKI) encryption and a certificate authority to allow the mobile computing device to encrypt the invoice image in a manner that may be decrypted by a payment entity but not by a retailer. The invoice image binary may be encrypted such that the details provided in the invoice image represent the transaction details authorized by the user.

Proceeding to 402, the mobile computing device displays an image of the cryptographically signed binary. The mobile computing device may display an image of the cryptographically signed binary to provide the signed version of the invoice image back to the retailer. The image may be displayed on a display associated with the mobile computing device in a manner that allows the image to be scanned by a scanner associated with a retail computing device. The displayed image may be any suitable type of digital image. In one implementation, the mobile computing device formats the cryptographically signed binary prior to displaying it. For example, the mobile computing device may format the cryptographically signed binary as a barcode image. In one implementation, the mobile computing device formats the cryptographically signed binary as a halftone image, such as a steganographic halftone image.

A retail computing device may capture a payment image of the cryptographically signed binary displayed on the mobile device. The retail computing device may capture the image through a camera or scanner. A user may hold the mobile phone up to a scanner to allow the retail computing device to capture the image. In some implementations, the invoice image may be cryptographically signed in a manner that the retail computing device may decrypt it to verify the purchaser. In some implementations, the invoice image may be cryptographically signed in a manner that the retailer is unable to decrypt it, and the retailer may send the cryptographically signed version of the invoice to a payment entity without verifying its content.

The retail computing device may process the payment image to extract information to transmit to a payment computing device. For example, the retail computing device may use optical character recognition to determine the text content of the image. In one implementation, the payment image is in the form of a barcode. The retail computing device may decode the barcode image to determine a string of text and transmits the string of text to the payment computing device. The retail computing device may transmit the image to the payment computing device without evaluating the payment image, and the payment computing device may perform additional processing. For example, the retail computing device may send an image of text without performing optical character recognition methods, and the payment computing device may perform an optical character recognition method to interpret the image.

In one implementation, the retail computing device transmits additional information to the payment computing device. For example, the retail computing device may transmit a customer name or identifier with the payment image such that the payment computing device may determine the decryption key associated with the particular customer. The retail computing device may send another version of the invoice such that the payment computing device may compare the invoice received from the retailer and the encrypted version from the mobile computing device to determine that the purchase information is compatible.

The payment computing device may decrypt the cryptographically signed invoice image. The successful decryption may indicate that the payment is authenticated. The payment computing device may determine the authorized payment amount from the decrypted invoice. The payment computing device may issue the determined payment amount to the retailer from an account associated with the particular customer or decryption key.

Figure 5:
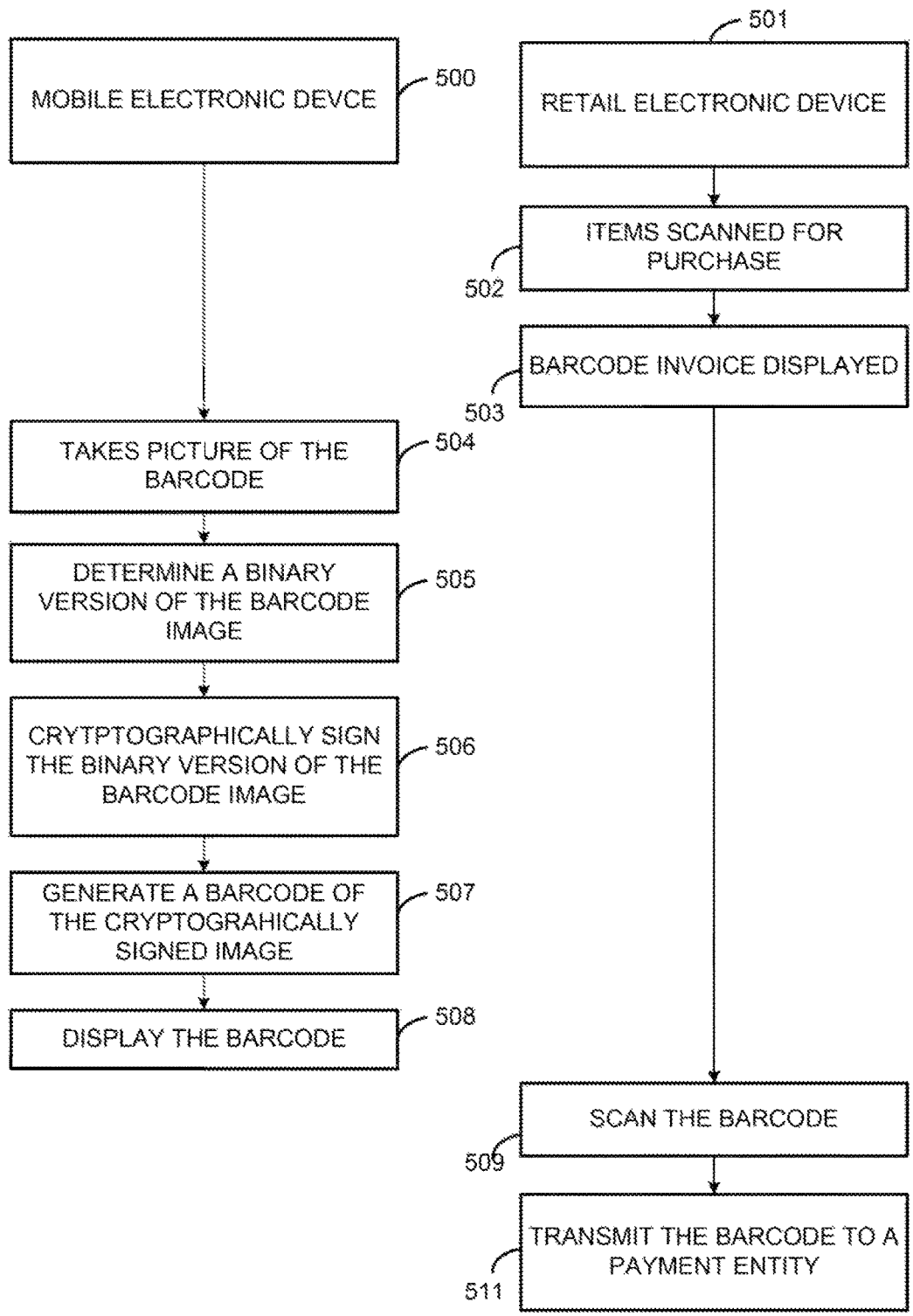
FIG. 5 is a diagram illustrating one example of a purchase performed by a mobile computing device communicating an encrypted invoice image to a retail computing device.

FIG. 5 is a diagram illustrating one example of a purchase performed by a mobile computing device communicating an encrypted invoice image to a retail computing device. The mobile computing device 500 and the retail computing device 501 may communicate payment information through a series of barcode images. At 502, items are scanned for purchase. For example, a user may scan the barcodes of items to be purchased with a scanner associated with the retail computing device 501. The retail computing device 501 may create an invoice of the transaction. The invoice may include the date, location, and contents of the purchase. The retail computing device 501 may encode the invoice in a barcode format. At 503, the retail computing device 501 displays the barcode of the invoice on a display associated with the retail computing device 501.

At 504, the mobile computing device 500 takes a picture of the barcode invoice displayed by the retail computing device 501. At 505, the mobile computing device 500 determines a binary version of the barcode image captured by the mobile computing device 500. At 506, the mobile computing device 500 cryptographically signs the binary version of the invoice barcode image. The image may be signed using information related to a payment account as the cryptographic key. At 507, the mobile computing device 500 generates a barcode image of the cryptographically signed image. At 580, the mobile computing device 500 displays the barcode of the cryptographically signed image on a display associated with the mobile computing device 500.

At 509, the retail computing device 501 scans the barcode. A user may use a scanner associated with the retail computing device 501 to scan the barcode displayed on the mobile computing device 500. At 511, the retail computing device 501 transmits information about the barcode to a payment entity. The payment entity may decrypt the image binary and provide payment to the retailer for the transaction in the amount included on the cryptographically signed invoice.

The invention claimed is:

1. A machine-readable non-transitory storage medium of a mobile computing device comprising instructions executable by a processor to:
   capture, using a camera of the mobile computing device, an invoice image of a barcode displayed by a retailer and that encodes information regarding a purchase transaction initiated by a user of the mobile computing device with the retailer;
   decode the information regarding the purchase transaction from the barcode of the invoice image and display the information to the user;
   in response to receiving confirmation from the user of the information:
      generate a binary version of the invoice image;
      encrypt the binary version of the invoice image with an encryption key comprising payment account information that identifies a payment account of the user with which the user is paying for the purchase transaction, the encryption key known by a payment processor and unknown by the retailer; and
      display the encrypted version of the invoice image to the retailer, the retailer capturing the encrypted version to transmit to the payment processor to fulfill payment for the purchase transaction against the payment account,
   wherein the payment for the purchase transaction is fulfilled without the retailer learning the payment account information.

2. The machine-readable non-transitory storage medium of claim 1, wherein instructions to encrypt the binary version of the invoice image comprise instructions executable by the processor to encrypt the payment information using at least one of: hash-based message authentication code encryption or public key infrastructure encryption.

3. The machine-readable non-transitory storage medium of claim 1, wherein instructions to generate the binary version of the invoice image comprise instructions executable by the processor to generate a binary version of an invoice barcode image.

4. The machine-readable non-transitory storage medium of claim 1, further comprising instructions executable by the processor to transmit the displayed image to a payment entity.

5. The machine-readable non-transitory storage medium of claim 1, wherein the payment account information comprises a payment account number.

6. The machine-readable non-transitory storage medium of claim 1, wherein the payment account information comprises a credit card number.

7. The machine-readable non-transitory storage medium of claim 1, further comprising instructions executable by the processor to:
  store payment information on machine-readable non-transitory storage medium, wherein the payment information comprises information identifying different payment accounts; and
display a user interface that allows a user to select one of the different payment accounts as the payment account identified by the payment account information.

* * * * *